S. NORO.
ATTACHMENT FOR HORSESHOES.
APPLICATION FILED JULY 29, 1913.
1,093,351.
Patented Apr. 14, 1914.
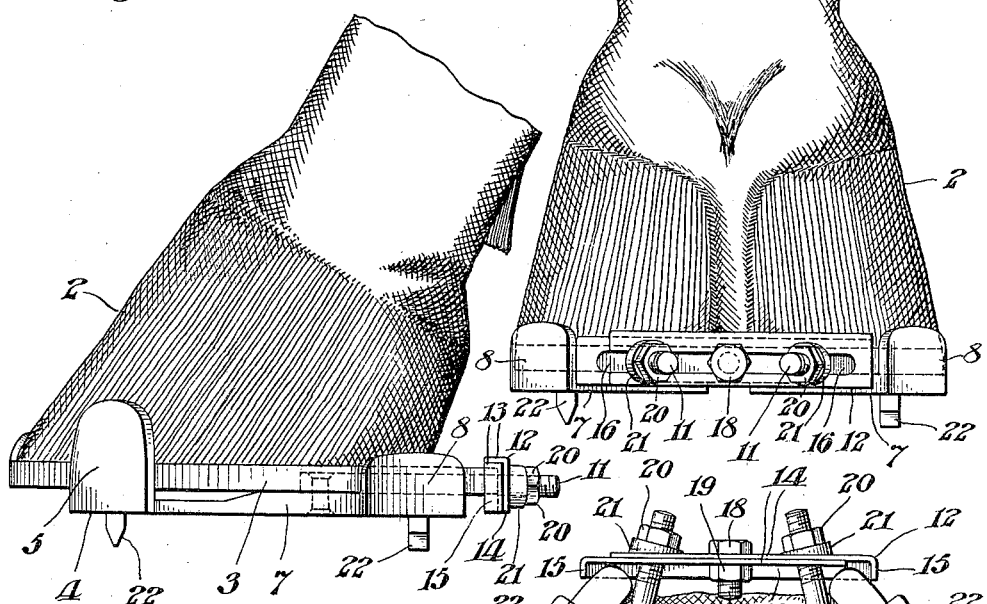
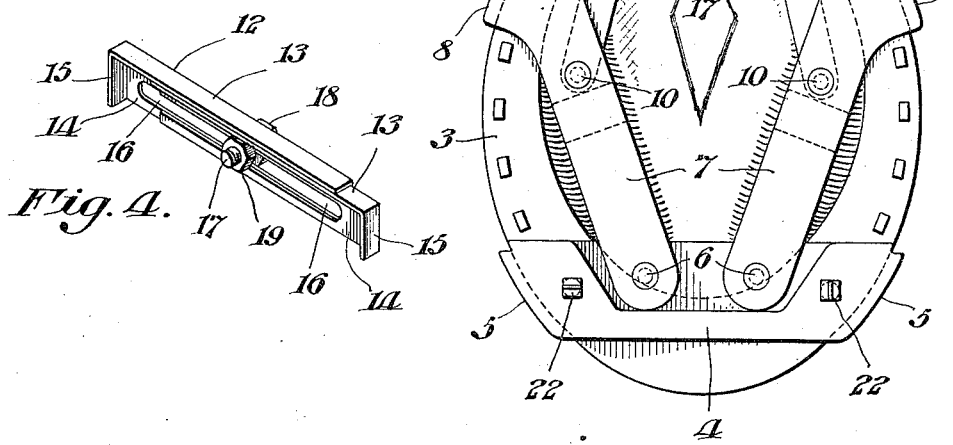
WITNESSES:
R. Schleicher
G. P. Sharkey
INVENTOR
Seikichi Noro,
BY
A. V. Grant
ATTORNEY.

UNITED STATES PATENT OFFICE.

SEIKICHI NORO, OF GLADWYNE, PENNSYLVANIA.

ATTACHMENT FOR HORSESHOES.

1,093,351. Specification of Letters Patent. Patented Apr. 14, 1914.

Application filed July 29, 1913. Serial No. 781,716.

*To all whom it may concern:*

Be it known that I, SEIKICHI NORO, a subject of the Emperor of Japan, residing at Gladwyne, in the county of Montgomery and State of Pennsylvania, have invented certain new and useful Improvements in Attachments for Horseshoes, of which the following is a specification.

This invention relates to attachments for horseshoes of the general character disclosed in my previous Patent No. 1034820, dated August 6, 1912, to which reference may be had.

The object of my present invention is to provide an attachment of novel, simple and efficient construction which will eliminate the securing straps disclosed in said previous patent and which will be provided with means adapted to engage the rearward portion of horseshoes of different sizes to hold the attachment in place, as will be hereinafter fully described and particularly claimed.

In the accompanying drawings, illustrating my invention: Figure 1, is a side view of a horse's hoof, a shoe thereon and my improved attachment applied thereto. Figure 2, is a rear elevation of the parts shown in Fig. 1. Fig. 3, is a bottom view of the parts shown in Fig. 1. Fig. 4, is a perspective view of the telescopic securing bar.

Referring to the drawings, 2 designates a horse's hoof, and 3 a horseshoe secured thereto.

4 designates a cross bar adapted to extend beneath the forward portion of the horseshoe 3. The ends of the bar 4 are provided with upwardly and inwardly extending projections 5 adapted to the outer faces of the sides of the forward portion of the horseshoe 3 and the superposed hoof 2, as shown. Pivoted side by side to the central portion of the bar 4, at 6, are the forward ends of arms 7 which diverge rearwardly from the pivots 6 and are movable thereon toward and from each other. The outer portions of the rearward ends of the arms 7 are provided with upwardly extending projections 8 adapted to engage the outer faces of the sides of the end portions of the horseshoe 3. The parts thus far described are very similar to parts shown in my previous patent hereinbefore referred to.

Pivoted to the bars 7, at 10, are the forward ends of a second pair of arms 11. The rearward ends of the arms 11 are connected to a telescopic bar 12, having its ends engaged with the rearward ends of the horseshoe 3.

The telescopic bar 12 comprises two sections adapted to slide one upon the other to shorten or lengthen the bar as desired. Each section of the bar 12 has a top wall 13 adapted to slide against the top wall of the other section; and each section of the bar 12 has a rear wall 14 adapted to slide against the rear wall of the other section; and each section of the bar 12 is provided with an outer end wall 15, as shown. The rear wall 14 of each section of the bar 12 is provided with a longitudinal slot 16 in registry with a slot in the rear wall 14 of the other section; and, extending through the slot 16, is a short bolt 17 having a fixed head 18 on one end thereof and an adjustable nut 19 on the other end thereof. The head 18 and nut 19 are adapted to engage the lapping portions of the sections of the bar 12 and hold them in positions of adjustment.

The rearward ends of the arms 11 extend through the slots 16 and are screw-threaded for the reception of clamping nuts 20. Interposed between the nuts 20 and the rearward face of the bar 12 are suitable angle washers 21.

When the attachment is applied to a horseshoe on a horse's hoof, the projections 5 are engaged with the sides of the forward portion of the horseshoe 3, and the projections 8 are engaged with the sides of the rearward portions of the horseshoe 3. The nut 19 is then loosened and the telescopic bar 12 is adjusted so that the top walls 13 will engage the upper faces of the rearward ends of the horseshoe 3, and so that the rear walls 14 will engage the rearward faces of the rearward ends of the horseshoe 3, and so that the end walls 15 will engage the outer faces of the rearward ends of the horseshoe 3, as shown in the drawings, whereupon the nut 19 is tightened to hold the two sections of the telescopic bar 12 in place. When the telescopic bar 12 is applied to the horseshoe 3 the rearward ends of the arms 11 are extended through the slots 16; and, thereafter, the washers 21 and nuts 20 are applied to the rearward ends of the arms 11. This being done the nuts 20 are tightened thereby drawing the rearward ends of the arms 7 toward each other and drawing the cross bar 4 and telescopic bar 12 toward each other and thereby firmly clamping the entire device to the horseshoe 3.

From the construction hereinbefore described, it will be understood that the entire device may be readily adjusted to fit horseshoes of different sizes; and that when the device is applied to a horseshoe it will be firmly held in place thereon.

The bottoms of the cross bar 4 and the arms 7 are provided with suitable anti-slipping calks 22, as shown.

I claim:

1. In an attachment for horseshoes, the combination of a cross-bar adapted to extend beneath a horseshoe and having upwardly-extending projections on the ends thereof, a pair of arms having their forward ends pivoted to said bar and having upwardly-extending projections on their rearward ends, a bar having ends adapted to be engaged with the ends of a horseshoe, a second pair of arms having their forward ends pivoted to the first named arms, and means for adjustably connecting the rearward ends of said second pair of arms to the last named bar.

2. In an attachment for horseshoes, the combination of a cross-bar adapted to extend beneath a horseshoe and having upwardly-extending projections on the ends thereof, a pair of arms having their forward ends pivoted to said bar and having upwardly-extending projections on their rearward ends, a bar having ends adapted to be engaged with the ends of a horseshoe, a second pair of arms having their forward ends pivoted to the first named arms and having their rearward ends screw-threaded and extended through the last named bar, and adjustable nuts screwed on to the rearward ends of said second pair of arms.

3. In an attachment for horseshoes, the combination of a telescopic bar having ends adapted to be engaged with the ends of a horseshoe, said bar comprising two sections and means for securing the sections together in different positions of adjustment, each of said sections having a top wall slidable against the top wall of the other section and adapted to engage the upper face of the rearward end of a horseshoe, each of said sections having a rear wall slidable against the rear wall of the other section and adapted to engage the rearward face of the rearward end of a horseshoe, and a bar forwardly of the first named bar and connected thereto and having upwardly-extending projections.

4. In an attachment for horseshoes, the combination of a telescopic bar having ends adapted to be engaged with the ends of a horseshoe, said bar comprising two sections and means for securing the sections together in different positions of adjustment, each of said sections having a top wall slidable against the top wall of the other section and adapted to engage the upper face of the rearward end of a horseshoe, each of said sections having a rear wall slidable against the rear wall of the other section and adapted to engage the rearward face of the rearward end of a horseshoe, each of said sections having an end wall adapted to engage the outer face of the rearward end of a horseshoe, and a bar forwardly of the first named bar and connected thereto and having upwardly-extending projections.

5. In an attachment for horseshoes, the combination of a telescopic bar having ends adapted to be engaged with the ends of a horseshoe, said bar comprising two sections having openings therein and means for securing the sections together in different positions of adjustment, a cross-bar forwardly of the telescopic bar and having upwardly extending projections, a pair of arms having their forward ends pivoted to said cross-bar and having upwardly extending projections on their rearward ends, a second pair of arms having their forward ends pivoted to the first named arms and having their rearward ends screw-threaded and extended through the openings in the sections of the telescopic bar, and adjustable nuts screwed on to the rearward ends of said second pair of arms.

6. In an attachment for horseshoes, the combination of two sections forming a telescopic bar, each of said sections having a top wall slidable against the top wall of the other section and adapted to engage the upper face of the rearward end of a horseshoe, each of said sections having a rear wall slidable against the rear wall of the other section and adapted to engage the rearward face of the rearward end of a horseshoe, each of said sections having an end wall adapted to engage the outer face of the rearward end of a horseshoe, the rear wall of each section having a slot therein in registry with the slot in the other section, a bolt extending through said slots and securing said sections together, a cross-bar forwardly of the telescopic bar and having upwardly extending projections, a pair of arms having their forward ends pivoted to said cross-bar and having upwardly extending projections on their rearward ends, a second pair of arms having their forward ends pivoted to the first named arms and having their rearward ends screw-threaded and extended through the slots in the rear walls of said sections, and adjustable nuts screwed on to the rearward ends of said second pair of arms.

In testimony whereof I affix my signature in presence of two witnesses.

SEIKICHI NORO.

Witnesses:
A. C. HAYNES,
MAY V. DOLAN.

Copies of this patent may be obtained for five cents each, by addressing the "Commissioner of Patents, Washington, D. C."